Patented May 31, 1927.

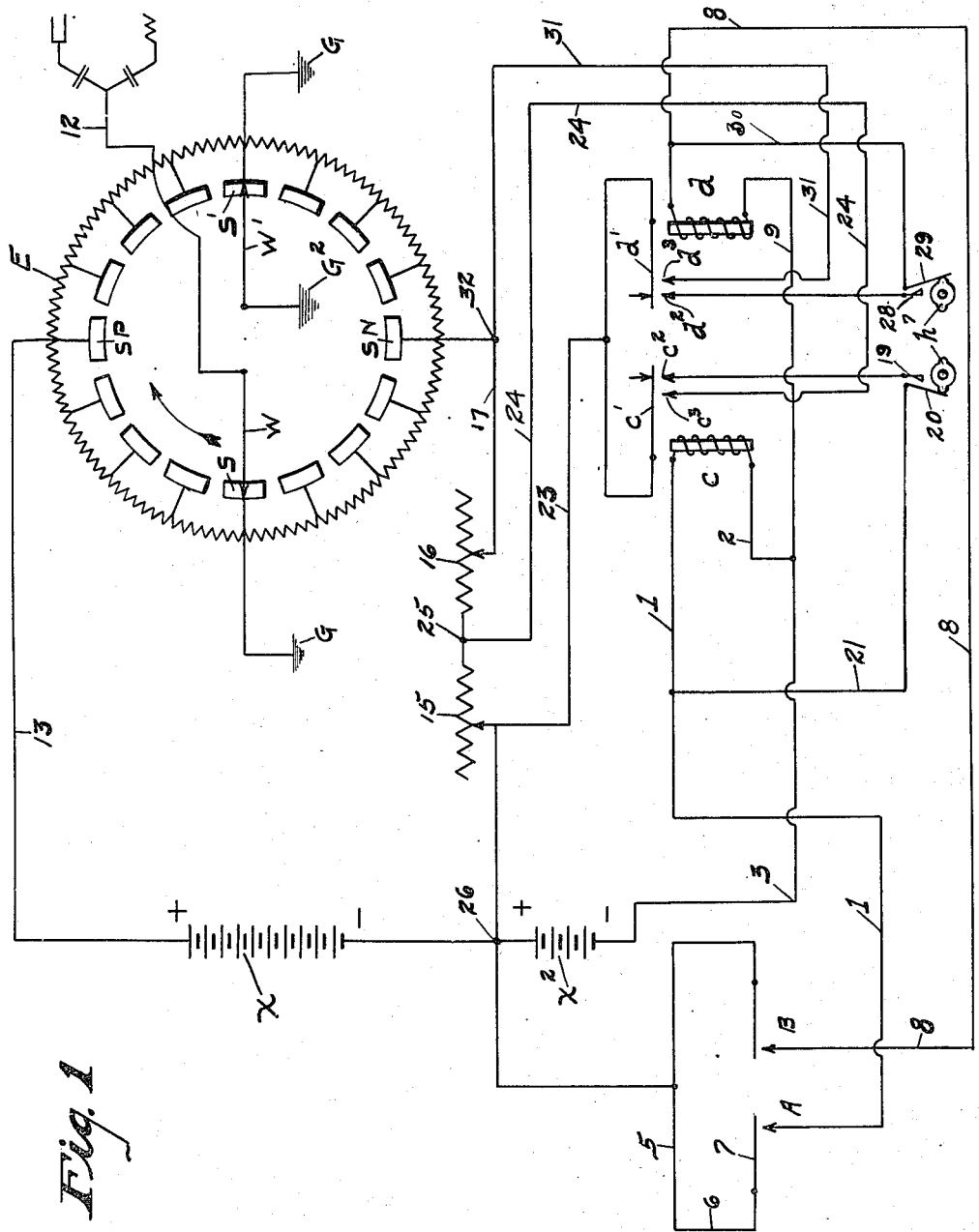

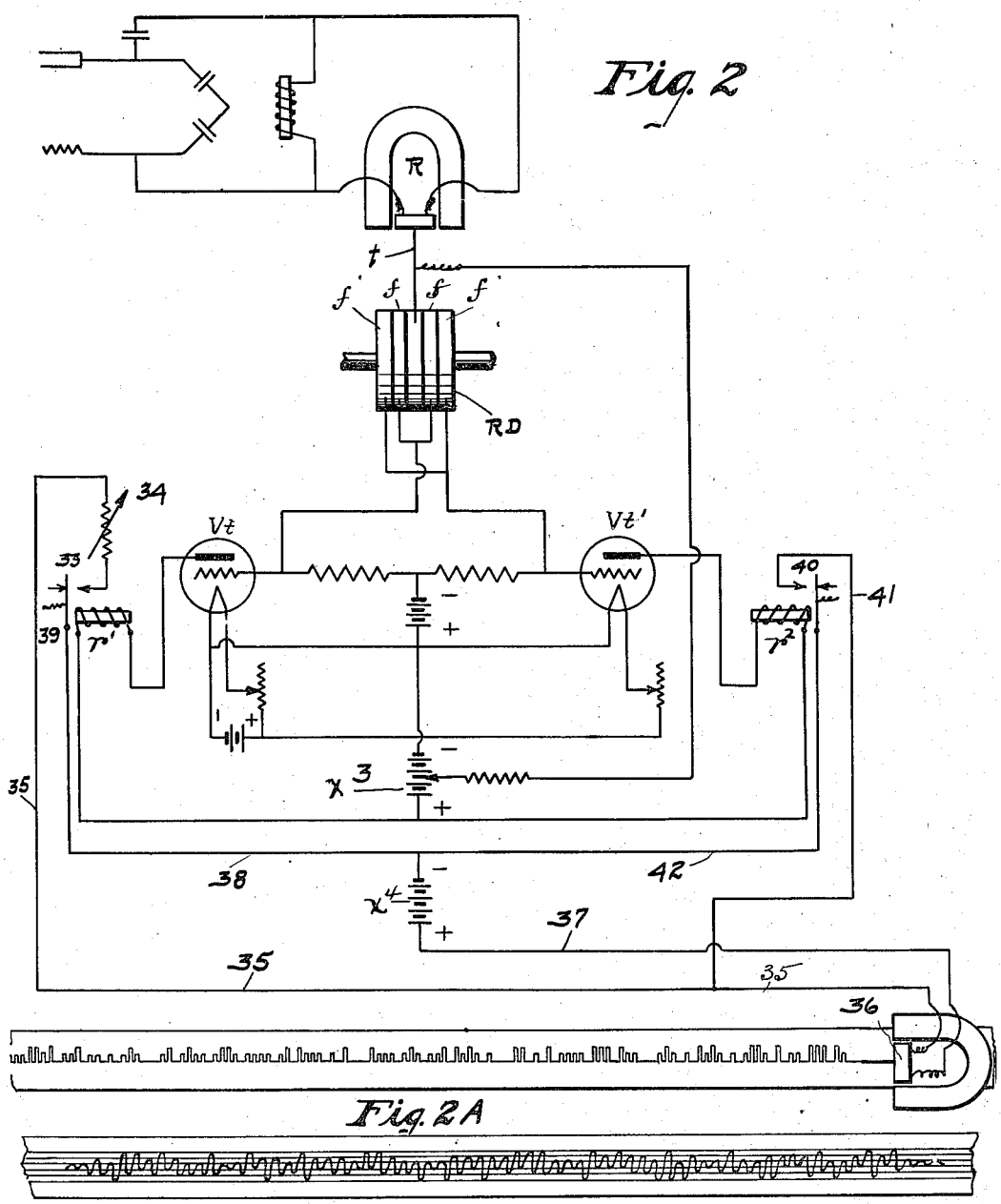

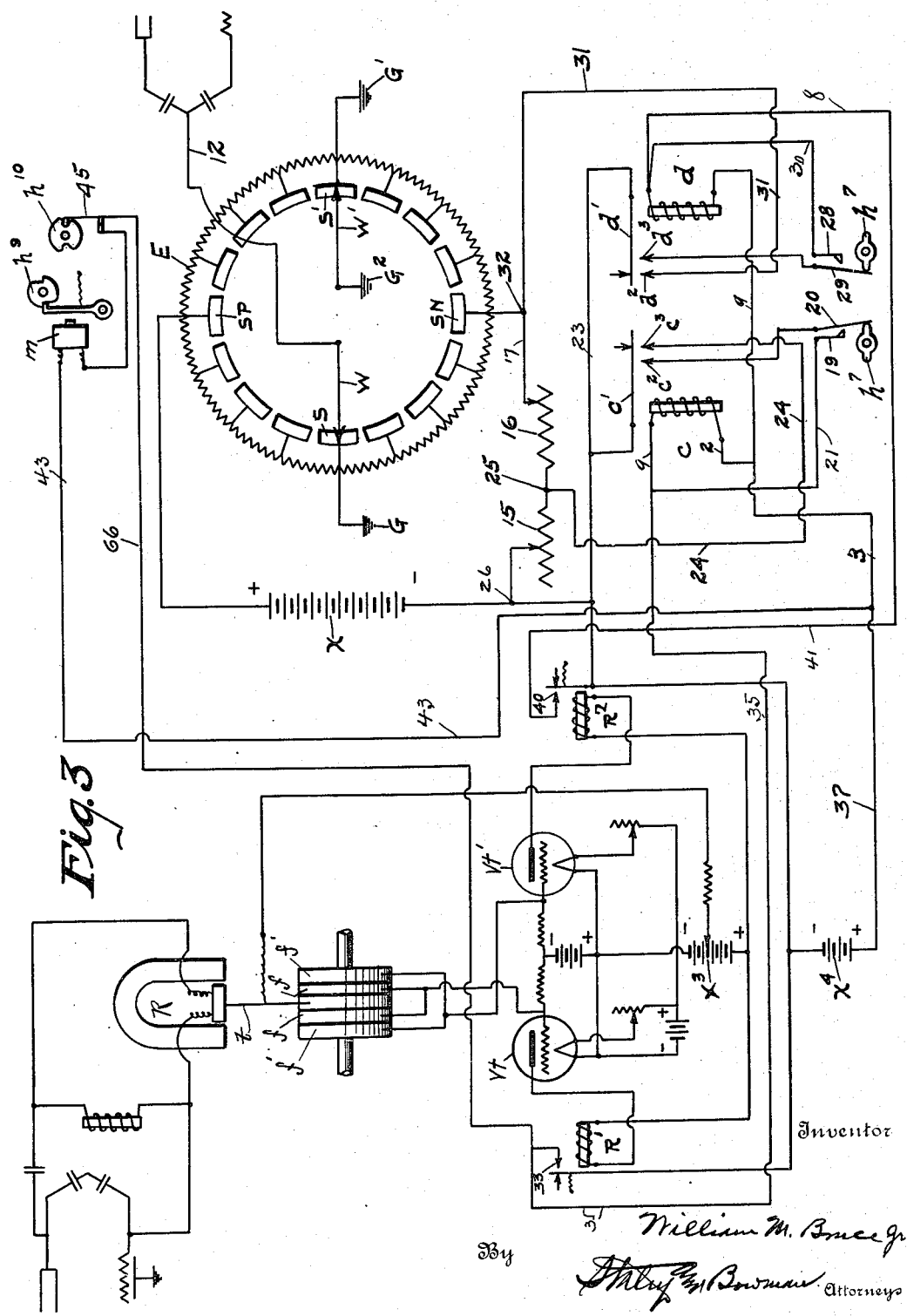

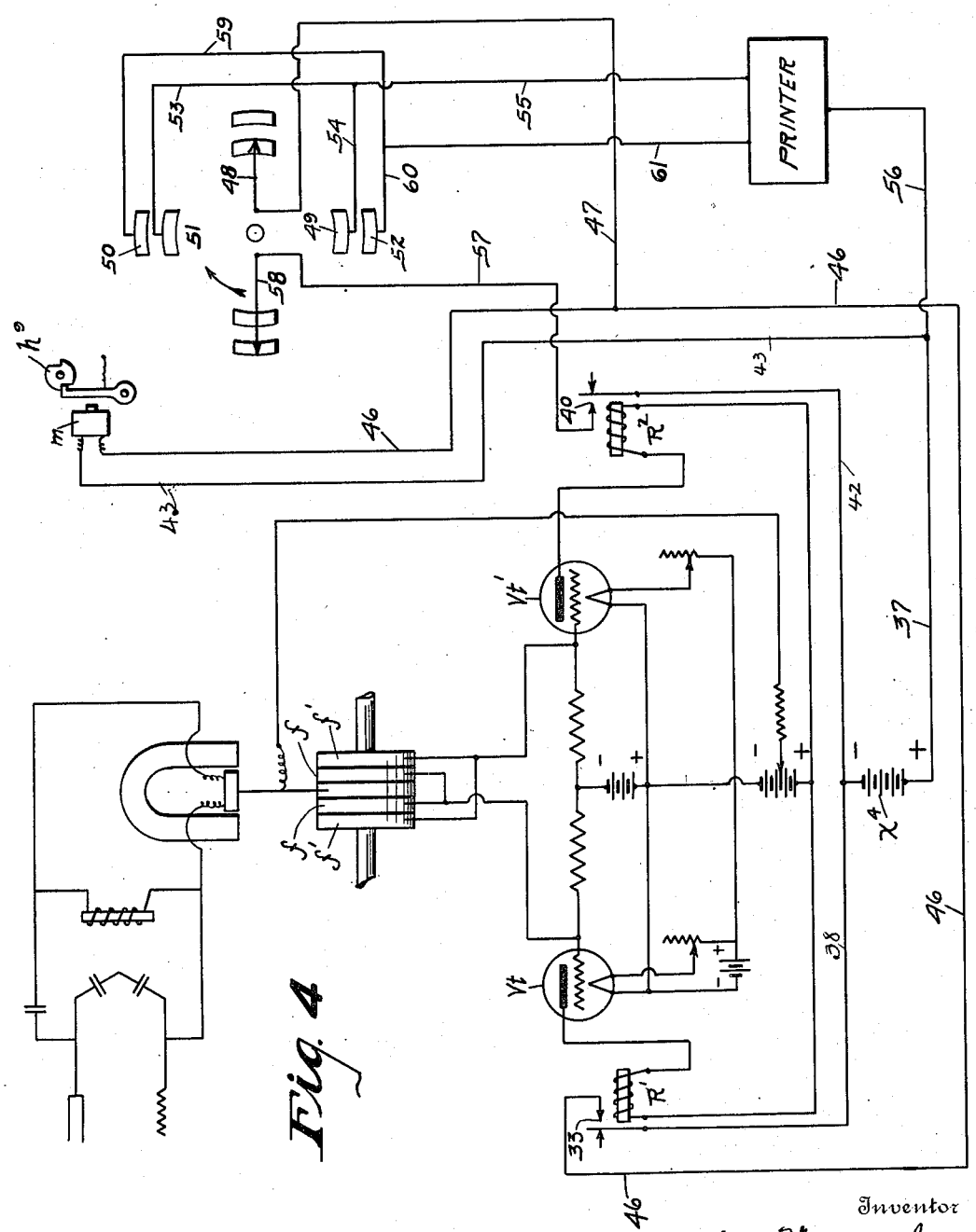

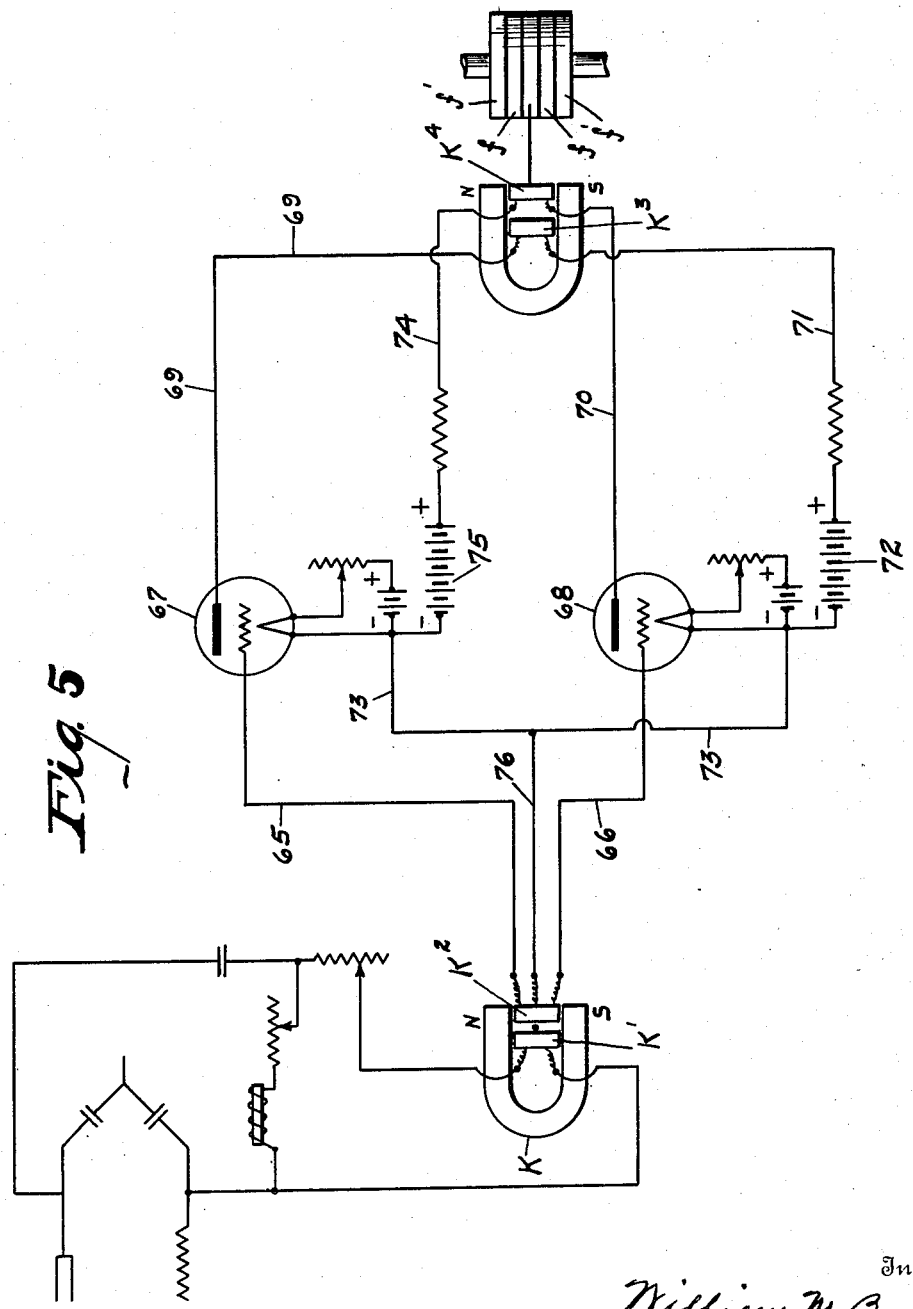

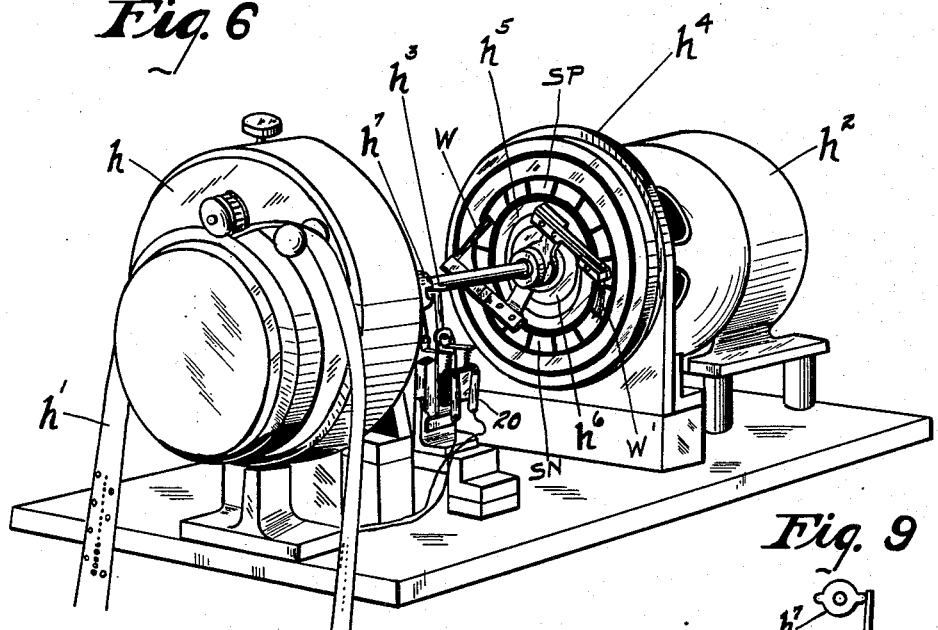
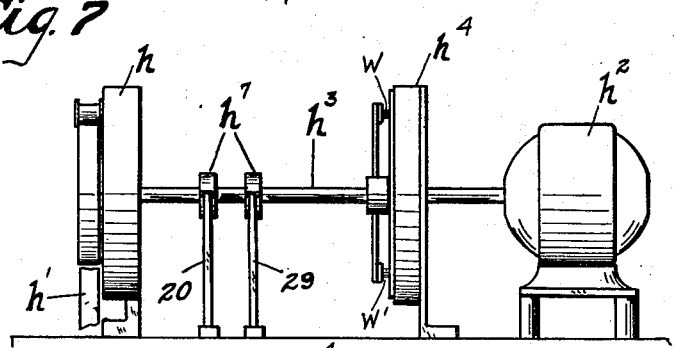
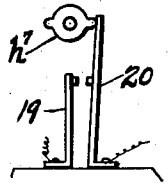
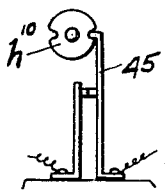
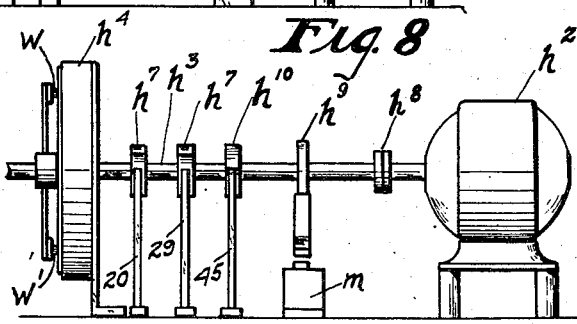

1,630,827

UNITED STATES PATENT OFFICE.

WILLIAM M. BRUCE, JR., OF SPRINGFIELD, OHIO.

ALTERNATING-CURRENT TELEGRAPH SYSTEM.

Application filed April 28, 1924. Serial No. 709,349.

My invention relates to a system and apparatus of telegraphy. It is especially adapted for telegraphing over submarine cables or lines of high capacity but may be used with advantage in any kind of telegraph lines.

The object of my invention is to provide means for increasing the speed and decreasing the errors in telegraphic transmission and I accomplish this object primarily in methods and apparatus by means of which the transmission is accomplished by alternating current.

The invention consists in various methods and apparatus and circuits hereinafter described and set forth in the claims.

In carrying out my invention I employ the ordinary continental Morse code of telegraphing but I transmit and receive the code elements of dots and dashes in such a way that each successive element is transmitted by a different polarity of current whether it be a dot or dash. If there are a series of dots one will be sent with a positive impulse, the next with a negative impulse and the same is true of the dashes or whether a dot follows a dash, each impulse representing a code element being a reversal from the preceding one, hence the transmission is by alternating current.

I further preferably make provisions for sending these reversals continuously on the line whether code elements are being transmitted or not and I secure the transmission of the code elements by increasing the current at each half cycle at which a code element is transmitted, the increase in the impulse being greater for one code element than another so that the characters are of the same duration or fundamental frequency but of different amplitudes and when recorded will be represented by longer or shorter marks above or below zero.

I further provide means for rectifying the signals when they are received and recorded so that the signals may be recorded by long and short vertical characters that can be very easily read.

While I preferably use means for supplying alternating current to the transmission line at all times the system is applicable to one in which the current impulses are supplied only to the particular code elements, that is the dots or dashes, but in any case there will be an alternation of polarity, each succeeding element representing a reversal from the preceding one.

I further preferably provide that in introducing the alternating current to the transmission lines each current impulse or signal shall be supplied to the line in graduated steps so that the resulting signal impulse is approximately of sine wave form.

The system is not only adapted to the direct transmission of cable code from one station to another but also lends itself readily to automatic repeating from one line to another and also to amplification at receiving or repeating stations by the use of thermionic tube amplifiers which is a part of the present invention.

In the accompanying drawings:

Fig. 1 is a diagrammatic view showing circuits and arrangements of the apparatus for transmitting the signal and signal elements at a cable terminal.

Fig. 2 is a similar view of the receiving end.

Fig. 2ª is a view showing one form of signal.

Fig. 3 is a diagrammatic view of a repeating station.

Fig. 4 shows in diagrammatic form the arrangement at a receiving station for operating printers of the creed or similar type from the impulses transmitted.

Fig. 5 is a diagrammatic view of a magnifier.

Fig. 6 is a prospective view of a transmitting apparatus with which is embodied the ordinary automatic tape transmitting device of standard character.

Figs. 7, 8, 9 and 10 are detailed views hereafter referred to.

Like parts are represented by similar letters of reference in the several views.

It may be stated at the outset that this improved system for transmitting and receiving cable signals may be used for the most part with the standard apparatus, for instance the transmission is accomplished by the standard automatic cable tape transmitter adapted to make the dot and dash contacts through the medium of contacting devices operated by a perforated tape. So also the received record may be received on the usual syphon recorder and with certain modifications can be received on a creed or similar printer for permanent record or upon a regenerative retransmitter for retransmission, if desired.

Referring now to Fig. 1, A and B are the contacting devices in any standard cable tape transmitting device, the one A being adapted to make a contact for a dot and the one B for a dash. c and d are relays that are operated when their circuits are closed at A or B. These relays would correspond to the ordinary transmitting relays in a cable circuit. The circuit for the relay c may be traced from A by wire 1 to magnet of relay c, wires 2 and 3 to battery 4 and thence by wires 5 and 6 to the contacting lever 7 at contact A. The circuit for relay d can be traced from contact B by wire 8 to coil of relay d, wires 9 and 3, battery 4, wires 5 and 10 to lever 11 of contact B.

It will be understood that these dot and dash relays c and d, if connected in the ordinary way with the battery and cable, would represent the usual method of transmitting dots and dashes in the present cable systems by supplying circuit of one polarity for a dot and of opposite polarity for a dash.

In order, however, to provide for a semi-sinus or half cycle for each signal element either a dot or a dash I preferably employ a source of direct current such as the usual cable battery with a pole changing controlling device which will be associated with the cable transmitter in such a way as to move positively therewith and effect a change in the polarity of the battery at each step or center hole of the tape transmitter. This pole changing and controlling device preferably consists of rotating brushes which will be connected to opposite ends of the transmission line, one of these brushes being connected direct to the transmission lines such as a cable and the other to the opposite end through the usual earth connection and I arrange to have these brushes make a half revolution for each center hole or half cycle during which each polarity of battery will be connected directly to the cable and during the opposite half of the revolution the opposite polarity of the battery will be connected directly to the cable so that for each revolution of the pole changer we will have one cycle of an alternating current.

This pole changing device in addition to the rotating brushes is preferably provided with a series of contacts or segments which are connected together successively by resistance and the positive and negative pole of the battery are connected to opposite segments which are arranged ninety degrees from the normal or zero segments which are connected to earth.

In Fig. 1 this pole changing controlling device is shown at E and the main battery at $x$. The rotating brushes are shown at W and W' and normally rest on the zero contacts or segments S and S'. The brush or wiper W is connected as indicated by wire 12 direct to the apex of the cable in the usual way while brush W' will be connected to the opposite end of the cable through earth as indicated at $G^2$, the segments S and S' being earthed or grounded at G and G'. The positive side of the battery $x$ is connected to segment SP by wire 13 and the negative side of the battery is connected to segment SN through wire 14, resistance 15 and 16 and wire 17.

In this position as indicated in Fig. 1 the pole changing controlling device forms a Wheatstone bridge connected to opposite sides of the battery, the four arms of which are equal and no current will flow from the wiper W to wiper W'.

These wipers W and W' being arranged on the same shaft and geared directly to the cable transmitting device will travel in the direction of the arrows, the wiper W passing and contacting successively with those segments which may be called positive segments from S to S', while the wiper W' will contact successively with what may be called negative segments from S' to S. As soon as the wipers leave the earthed segments S and S' the balance of the Wheatstone bridge will be disturbed and current will begin to flow from the positive side of the battery through the cable to earth and through W' to the negative side of the battery and thus current flow to the cable will gradually increase as these wipers pass over the respective segments until they have travelled a distance of ninety degrees and wiper W rests upon the segment SP and wiper W rest upon segment SN, at which time we will have a direct connection from the positive to the negative side of the battery through the cable or other transmission line and the full potential of the battery will be supplied to the cable except for the resistances 15 and 16 which will cut down the battery potential on the cable for the purpose hereinafter explained. As the wipers continue to revolve over the remaining segments increasing graduated resistance will be put into the circuit until the wipers have travelled one hundred eighty degrees or one half revolution when the wiper W will rest upon segments S' and the wiper W' will rest upon segment S at which time the Wheatstone bridge balance will be restored, and current will cease to flow from battery to the cable and the cable will be directly earthed at G', thus discharging the same.

This completes one half cycle which by reason of the decreasing and then the gradual increasing of the resistances between the respective segments will charge the cable in a series of graduated steps and discharge it in the same manner approximating a sine wave form of impulse.

As the wiper continues to revolve W' will now begin to transverse the positive segments and wiper W will transverse the negative segments and the operation will be repeated with negative battery supplied to the cable and the positive battery connected to earth and after a complete revolution and the parts have returned to normal position as indicated in Fig. 1, a complete cycle will have been secured with a reversal of polarity at each half cycle, thus producing one cycle of an alternating current of an approximate sine wave form.

As long as the transmitting device with the wipers continue to operate alternating current will be supplied to the cable one half cycle for each center hole in the tape, but the resistances 15 and 16 are such that the current thus supplied to the cable will be controlled by the resistances 15 and 16.

For signalling, means are provided to shunt the resistances 15 and 16 to produce the desired difference in amplitude between dots and dashes.

For instance, if a dot is to be transmitted the automatic transmitter will operate the dot contact or pecker pin closing the circuit for the relay $c$ at contact A through the circuit heretofore described. This will energize the relay $c$ and operate its armature $c^1$. Opposite the armature $c^1$ are two contacts $c^2$ and $c^3$. The first of these contacts $c^2$ is in a circuit as follows: from $c^2$ through wire 18, contacts 19 and 20, wires 21 and 1 to relay $c$ thence through wires 2 and 3 to battery $x^2$ and wire 23 to the armature $c^1$. The contacts 19 and 20 are normally open and are held in this position by a cam on the same shaft with the wipers W and W'. At the first movement of this shaft from normal position the cam will release the contacts which will close automatically. This locks the armature in its operated position during the entire movement of the wipers over the segments as hereinbefore described, that is during a one-half revolution or half cycle at which time the cam will open contacts 19 and 20 and deenergize the relay $c$.

The contact $c^3$ is connected by wire 24 to a point 25 between the resistances 15 and 16 and the wire 23 is connected to wire 14 at the point 26 so that so long as the armature $c^1$ is closed current from the battery $x$ will pass from point 26 through wire 23, armature $c^1$, contact $c^3$, wire 24 to the point 25, (thus shunting the resistance 15) and thence through the resistance 16, wire 17 to negative battery at SN. During this one-half revolution of the wipers, therefore, the current flow of the one-half cycle will be increased by cutting out the resistance 15, thus producing the dot element or amplitude.

If the dash contact is closed at B the relay $d$ will be operated over the circuit hereinbefore described through wire 8, relay $d$, wires 9 and 3, battery $x^2$, wires 5 and 10 to contact B. The armature $d^1$ of this relay is also provided with two contacts $d^2$ and $d^3$, one of which is connected through wire 27, contacts 28 and 29, wire 30 to wires 8 and 9 and battery $x^2$ and wire 23 to the armature $d^1$. The contacts 28 and 29 are operated in a similar way by a cam which permits the contacts to close at the first movement of the shaft after the dash contact has been closed and holds the relay $d$ energized during the one-half revolution. The contact $d^3$ is connected by wire 31 to wire 17 at the point 32 so that negative battery would be connected from point 26 through wire 23, armature $d^1$, contact $d^3$, wire 31 to wire 17 at 32, thus shunting the resistances 15 and 16 and allowing the full potential of the battery to be supplied to the pole changing and controlling device.

By this arrangement when either a dot or a dash contact is closed the half cycle whether negative or positive at which it occurs will have its potential augmented by a small or a larger amount, depending upon whether it is a dot or a dash and the signal elements introduced in the cable will appear as shown in Fig. 2$^a$, the cycles of alternating current being represented at the beginning and end of the phrase by a fundamental frequency and the signal elements by a variation of amplitude.

These signals may be received by a syphon recorder at the opposite end of the cable in the usual way and would appear as shown in the Figure 2$^a$ referred to. But for ease in reading and as a part of my system I have provided a new and novel means for receiving these signals and this may be described as follows, having particular reference to Fig. 2.

In this view R is a receiver preferably of the usual galvanometer or movable coil type which will be connected to the cable in the usual way. It is provided with a movable tongue $t$ which is adapted to contact with different segments of a revolving drum somewhat similar to that used in the well known Brown drum relay. The tongue $t$ normally rests on the zero or no man's land on each side of which there are two contacting segments $f$ and $f^1$ insulated from each other, contacts $ff$ being connected together and representing the dot and the outer contacts $f^1f^1$ being connected together and representing the dash. The zero or no man's land is of such size that the excursion of the tongue due to the alternating current passing continually into the cable will not move it sufficiently to engage the dot contacts.

When this alternating current or any half cycle thereof whether positive or negative is augmented by a sufficient potential to represent a dot the tongue $t$ will move to one side or the other sufficiently to contact with one of the inner contacts $f$ and if the half cycle should be augmented by a current representing a dash it would move to one of the outer contacts $f^1$.

The segments $f$ and $f^1$ on the revolving drum may be connected to any suitable recording device such as a syphon recorder and if so connected when a current impulse is augmented to a greater or less extent, the increase in the potential of the positive or negative cycles will cause the syphon recorder to move in one direction or the other to a greater or less extent making a shorter mark for a dot and a longer mark for a dash. These longer and shorter marks, however, would be on either side of the zero depending on whether it is a positive or negative cycle which receives the modulated increase and the record in that case would be such as shown in Fig. $2^a$.

I prefer, however, to use means for rectifying or changing the form of the signal so that the short and long marks will always be in substantially vertical lines and this I accomplish as follows:

The dot and dash segments $f$ and $f^1$ of the rotating contact are preferably connected to the grid elements of vacuum tube relays VT and VT' while the plate circuits of these respective vacuum tubes are connected through a suitable battery $x^3$ to relays R' and R$^2$. These vacuum tube relays may be similar to that described in my pending application Ser. No. 630,294.

The relay R' when energized closes a circuit through contact 33, variable resistance 34, wire 35, recorder 36, wire 37, battery $x^4$, wire 38 to contact 39. If the tongue 6, therefore, should move to either one of the inner or dot contacting segments $ff$ on the drum the relay R' would be energized and would operate the recorder 36 which may be of the usual syphon recorder or direct writer type. If the tongue $t$ should move to one of the outer or dash contacts $f^1f^1$, the relay R$^2$ would be energized and would close a circuit from contact 40, wires 41 and 35, recorder 36, wire 37, battery $x^4$ and wire 42 to the contact 40. This would operate the recorder 36 but inasmuch as the first mentioned circuit contains resistance 34 the recorder would be moved to a less distance when the relay R' is operated than when relay R$^2$ is operated and the recorded signals would appear as shown at the bottom of Fig. 2, which represents an exact photographic reproduction of received signals transmitted in the form shown in Fig. 2.

In Fig. 3 I have shown means for repeating from one cable or conductor to another and this consists largely of a combination of the receiving circuit shown in Fig. 2 and the transmitting circuit shown in Fig. 1 with this essential difference. The tape transmitter is eliminated and the pole changing and controlling device is operated directly by a suitable motor and the transmitting relays $c$ and $d$ arranged to short circuit or shunt the resistances 15 and 16 in the battery circuit are operated from the relays R' and R$^2$ so that if positive or negative cycles of slightly increased potential are received it operates relay R' and it in turn operates relay $c$ while if one of a greater increased potential is received it operates relay R$^2$ which will in turn energize relay $d$. The arrangement for holding the relays $c$ and $d$ during the half revolution of the wipers is the same as heretofore described.

In repeating with this system it is essential that the transmitting pole changer and controlling device be synchronized with that at the repeating station and I accomplish this by a stop and start mechanism of any usual type which will stop the rotation of the wipers at each half revolution and cause them to start only when a signal is being sent at which time the stop mechanism will be released and the wipers will start to rotate coincident with the beginning of the signal. This I accomplish in a very simple way as shown in Fig. 3.

It is obvious that whenever a signal is received whether a dot or a dash the tongue $t$ will contact with the inner set of contacts $f$ on one side of the zero and will energize relay R'. When a dash is to be recorded both dot and dash relays R' and R$^2$ are operated and the recorder 36 will get the full potential of the battery $x^4$. If the tongue moves to one of the dot contacts $f$ the recorder will get less than the full potential of the battery and the result will be a long or short vertical line as indicated in Fig. 1.

I make use of this fact for operating the start and stop device of the pole changer at the repeating station by placing the magnet which controls the stop and start device in circuit with the contacts of the dot receiving relay R'. This magnet is shown in Fig. 3 at $m$ and the circuit for it can be traced from battery $x^4$, wires 37 and 43, magnet $m$, wire 44, circuit closer 45, wire 46 to contact 33. The circuit closer 45 is normally closed but will be operated by a cam on the same shaft with the wipers similar to that theretofore described for the transmitting device so that the circuit will be opened at the first movement of the shaft 1. It will be seen that whenever the relay R' is operated by the tongue $t$ contacting with either one of the inner or dot sets of contacts $f$ the magnet $m$ will be energized and thus start the pole changing and controlling device to revolving. The circuit closer 45 is normally closed and is opened as soon as the wipers begin to rotate so that the only time that the magnet m can be energized will be when the wipers are on the segments S and S'. When the magnet is deenergized by opening the circuit at 45, the stop device will be released and stop the rotation of the wipers at the half revolution unless a signal or signal element should be received at that time when the operation would be repeated.

In Fig. 6 the general arrangement of the parts for transmitting alternating current and alternating current signals is shown. In this view $h$ represents the usual automatic transmitting device operated by the perforated tape $h^1$ in the usual manner.

This may be driven from a motor $h^2$ by means of the directly connected shaft $h^3$. Surrounding the shaft and supported in a suitable frame $h^3$ are the segments S, S', SP, SN, etc., with which the brushes W and W', secured to the shaft $h^3$ and insulated from each other, rotate. In order to secure the necessary connections to the rotary brushes solid contacting rings $h^5$ and $h^6$ are provided and auxiliary brushes or wipers are arranged to contact with these respective rings and form electrical connection between the same and the segment wipers W and W'. One of these rings is connected to the cable and the other to earth as explained. The circuit closers for holding up the transmitting relays $c$ and $d$ are connected at 20 and 29 with the cams $h^7$ for operating the same. In Fig. 7 the same parts are shown somewhat in diagram and in the nature of an elevation view. In Fig. 8 there is shown an arrangement of the parts for repeating. In this case the automatic transmitter $h$ is omitted; a suitable clutch $h^8$ is provided between the motor and the shaft $h^3$ which will permit the shaft and its connected parts to stop while the motor continues to revolve. At $h^9$ is shown the stop device on the shaft which operates in connection with the stop mechanism and magnet $m$. $h^{10}$ shows the cam which operates the circuit breaker 45. The cams $h^7$ for closing the holding circuits for the relays $c$ and $d$ are also indicated and a detail view of this is shown in Fig. 9.

It will be understood that in the normal position of the repeating device the circuit breaker 45 is closed and the circuit closers 30 and 29 are open. The stop device is in the position shown in Fig. 3 with the wipers on the ground segments S and S'. The first movement of the tongue on the receiver R energizes the magnet $m$ and permits the shaft $h^3$ to revolve carrying the wipers W and W'. The first movement of the shaft releases the circuit closers 20 and 29 and opens the circuit closer 45. This permits a one-half revolution of the shaft and connected parts, when they will again assume their normal position and remain in this position until a succeeding signal.

For operating printers such as the Creed in which dot or dash impulses, representing the ordinary continental code, are adapted to set up letters of a printer, I provide a somewhat different arrangement as shown in Fig. 4. For this purpose I employ a rotating distributor having two wipers or brushes arranged on the same shaft and provided with a stop and start mechanism similar to that already described. The relays R' and R² operated from the tongue $t$ of the receiver R are employed as before, and the first movement of the tongue $t$ onto a dot contact is used to operate the starting mechanism through the magnet $m$ and permit the brushes or wipers to begin their movement. These brushes with their stop mechanism are so connected that they rotate one-half revolution and stop. During this rotation the respective brushes contact with segments arranged in pairs, diametrically opposite each other and preferably in two concentric rows. The wipers or brushes are supported on arms of different lengths so that one brush or wiper contacts with the outer segment of the pair and the other wiper contacts with the inner segment of the pair. The arrangement is such that if the relay R' is operated at the time these wipers are on the respective contact segment an impulse of one polarity is sent into the printer and when the relay R² is operated an impulse of opposite polarity is sent through the printer so that the printer receives impulses of positive and negative character in response to the dot and dash signals instead of impulses of greater or less potential. In this case, as described for the repeater, the operation of the relay R' representing the dot operates the starting mechanism and if this should be followed by the operation of the relay R² the dash impulse will be sent to the printer inasmuch as the operation of the relay R' would have no effect upon the printing device as no impulses can be transmitted to it until the respective wipers have reached the connected pairs of contacts and the time in which it takes to rotate to this position will be proportioned to the time it takes the relay tongue to pass over the dot contact and reach the dash contact of the receiving revolving drum relay and during this time the dot relay R' will have been deenergized by the tongue $t$ passing off of contact $f$.

If the tongue $t$ should move only to the dot contact $f$ of the revolving drum, then the relay R' would be operated and the dot signal received would be transmitted to the rotating distributor, the arrangement being such as before described that the operation of the relays would be timed to the movement of the distributor so that the closing of the contacts of relays R' and R² takes place only when the distributors are on the respective circuit closing contacts.

The circuit for operating the start and stop device is the same as that shown in Fig. 3. If the relay R' should be operated closing the circuit at 33 the circuit would be traced from the contact 33 to battery $x^4$ by wires 37 and 43 to the magnet 4, thence by wire 46 back to contact 33. A branch wire 47 leads from wire 46 to the wiper 48 of the distributor. This wiper is adapted in its revolution to engage segments 49 and 51. These segments 49 and 51 are tied together by wires 53, 54 and are also connected to the dot operating mechanism of the printer by wire 55 with a common return wire 56 leading from the printer to line 37 and to the other side of the battery $x^4$. In a similar way the contact 40 of the relay R² is connected by wire 57 to the wiper 58 which is adapted in its revolution to contact with the segments 50 and 52. These contacts are also tied together by wires 59 and 60 and to the printer by wire 61 so that at each operation whether for a dot or a dash the stop and start mechanism will be operated at the first movement and if it is a dot the impulse will be transmitted through the wiper 48 and contact 49 or 51 as the case may be, depending upon the positions of the wiper in starting, and thence by wire 55 to the printer. If the dash relay is operated the relay R' will first operate the starting mechanism and then become deenergized while the wipers are moving from normal to contacting position and the relay R² will close a circuit through battery $x^4$, contact 40, wire 57, wiper 58 and segment 52 or 53 as the case may be, wire 61 to the printer and wires 56 and 37 back to the battery $x^4$ so that the printer will receive the dot or dash impulses necessary to set up the printer in the usual way.

The distributor in this case may be treated as typical only as various means of transmitting these signals from relays R' and R² to the printer may be employed.

Where owing to the capacity of the conductor or other conditions the received signals are of extremely low potential and of themselves are insufficient to operate contacting devices, where any considerable work is to be performed it is desirable to magnify these signals and also to do this with mechanism which requires the minimum amount of labor to be performed by the received signal.

Up to the present time it seems to be conceded that a receiver of the movable coil of the D'Arsonval type has proved to be the most satisfactory, particularly for receiving signals on submarine cables of high capacity. For magnifying signals received on a movable coil of this type I have made use of what I believe to be an entirely new method of increasing the signals by employing an entirely separate current generating device or regenerative coupling by means of which the receiving coil has no work to perform except to move in response to the signals and in connection with this coil I provide a separate independent coil preferably superimposed on the other coil but with no electrical connection therewith either direct or inductive. In other words it is non-inductively related to the coil which receives the signals while moving in exact synchronism therewith. In this non-inductively related coil by a movement coincident with the movement of the receiving coil there is generated a current or current impulse having the same potential and polarity characteristics of the current which moves the receiving coil and these regenerated current impulses are used to change the potential of the grid element of a thermionic tube and the increased current from the plate circuit of the tube used to operate the recording or other receiving devices.

This form of magnifier and its circuits are shown in Fig. 5 where I have illustrated it in its simplest form showing one thermionic tube only for the respective positive and negative impulses. It will be noted, however, that these tubes may be cascaded in the usual way to magnify the regenerated impulses to any required or desirable potential.

Referring to Fig. 5 K represents a receiver of the usual galvanometer type with a movable D'Arsonval movable coil K' which will respond to current impulses of varying potential and polarity in the usual way. Mechanically connected with this coil is a separate coil K² noninductively related to the first coil and having no electrical connection therewith, so that when the coil moves in one direction in relation to the permanent magnets of the receiver current impulses will be generated and flow in one direction in this coil and when moved in the other direction current impulses will be generated and flow in the opposite direction. The respective terminals of this regenerative coil K² are connected by wires 65 and 66 to the grid elements of thermionic tubes 67 and 68 and back to the center of coil K² through wires 73 and 76 so that in either case the grids will be charged with positive potential.

The plate circuits of these respective tubes are connected by wires 69 and 70 to relays upon which the amplified signals are to be impressed. Various forms of relays could be used for this purpose, but I preferably employ a device of the movable coil type having two separate and independent coils on the same frame and adapted to move the contacting device of a relay or the stylus of a recorder or other device which may be used in connection therewith. These coils are shown at K³ and K⁴, coil K³ being connected to the plate of the tube 67 by wire 69 and thence by wire 71 through the battery 72 and wire 73 to the filament of tube 67, the circuit from the plate of tube 68 is by wire 70, coil $K^4$, wire 74, battery 75 and wire 73 to the filament of the tube 68. The coils $K^3$ and $K^4$ will be wound in opposite directions so that a current impulse in one coil will move it in one direction and a similar impulse in the other coil will move in the opposite direction, and as the coils are mechanically connected so as to move together the contacting device or stylus will move in different directions in response to these current impulses.

Now, when the coil $K'$ of the receiver moves in one direction in response to an impulse of one polarity and moves the coil $K^2$ in the same direction a corresponding current is generated in the coil $K^2$ and flowing through one-half the coil will change the potential on the grid of tube 67 which in turn through its plate circuit will send a corresponding impulse or current through the coil $K^3$ of the translating device, relay or recorder. When the coil $K'$ moves in the opposite direction a similar current will be generated in the coil $K^2$ and flow through the other half of the coil and will change the potential on the grid of the tube 68 causing a corresponding impulse or current to pass through the coil $K^4$ of the translating device and thus operate the same but in the opposite direction.

By increasing the number of tubes in the magnifier these regenerated current impulses can be magnified to any desired extent and inasmuch as the regenerative coil $K^2$ is mechanically connected but electrically disconnected from the coil $K'$ any disturbing influence on the coil $K'$ which might tend to distort the signals will be eliminated in the regenerative circuit since the direction of movement of the coil and its speed of movement will be the determining factors in the character of impulses generated in this coil.

While this magnifying arrangement has been designed for use in the alternating current system herein described it is obvious that it could be used with any system in which current reversals are to be amplified.

Having thus described my invention, I claim:

1. In a telegraph system, means for producing alternating current reversals of an approximately sine wave form from a direct current supply, and means for varying the amplitude of individual half cycles in phase with the alternating current frequency and employing impulses of different current values to produce signal elements.

2. In a telegraph system, the method of transmitting signal elements which consists in producing alternating current reversals from a direct current supply modifying the current half cycles in steps approximating a sine wave form, amplifying individual half cycles in phase with the alternating current reversals and employing the impulses of different current values for producing signal elements.

3. In a telegraph system, a source of current supply, a polarity changing device having means for modifying each half cycle of current impulses in steps so as to approximate a sine wave form, and means for varying the amplitude of the individual half cycles in phase with the alternating current frequency in response to transmitting devices representing dots and dashes.

4. In a system for telegraphing, an automatic tape transmitter, and a pole changing device connected to said transmitter so as to rotate in unison therewith, means for sending impulses from said transmitter into said pole changing device and variable resistance in said pole changing device progressively arranged so that the potential of the impulses imparted thereto is increased in steps of approximately a sine wave form, and means for varying the amplitude of individual half cycles in phase with the alternating current reversals in response to current impulses from said automatic transmitter.

5. A cable transmitting device adapted to send current impulses of different polarity from a perforated tape, a source of current supply, and a pole changing device connected to the perforated tape transmitter to cause the same to move in step therewith, resistance normally in circuit with the source of current to said pole changing device, and means for shunting a portion of said resistance in response to the current impulses from one set of perforations and for shunting additional resistance from said circuit in response to another set of perforations.

6. In a telegraph system, means for imparting to a conductor alternating current of approximately sine wave form and for varying the amplitude of individual half cycles in response to current impulses, a revolving drum with two or more electrical insulated segments arranged on opposite sides of a zero position, a contact member operated by the current impulses to cause the same to engage with the different segments in response to the current impulses of different potential, and mechanism operating in response to the contact with the different segments to record the signal elements in the form of dots and dashes.

7. In a transmitter, a rotating pole changing device, and a source of current supply, resistance in the circuit between the source of supply and the pole changing device, transmitting relays adapted to shunt a part of the resistance from said circuit when one relay is operated and for shunting additional resistance from said circuit when the other relay is operated, said pole changing device having means for varying the potential of each impulse in steps whereby current impulses are transmitted to the conductor in approximately sine wave form and the amplitude of half cycles varied by the operation of the transmitting relays in phase with the frequency of the alternating current produced by said pole changing device.

8. In a transmitter, a source of current supply, and a pole changing device having means for changing the resistance of the circuit in progressive steps so as to produce alternating current of approximately sine wave form, means for supplying impulses of different current values by the operation of transmitting relays representing different signal elements and means for locking said relays in their operated position during the movement of said pole changing device representing a half cycle and releasing said relays when the half cycle is completed.

9. In a telegraph system, the method of receiving telegraph impulses of a plurality of current values which consist in operating by the signal impulses a generator to produce current impulses corresponding in polarity and potential to the received signal impulses employing the generated current impulses for changing the potential on a thermionic tube and utilizing the change in potential for operating signal translating devices.

10. In a telegraph system, a receiver embodying a movable coil having a tongue to move in response to current impulses of different values and engage contacting segments arranged in pairs, said segments being supported on a rotating drum so that the segments of one pair will be engaged by the tongue when moved by current impulses of one value and the segments of the other pair engaged by the tongue in response to current of a different value, operating relays connected to the respective pairs of drum contacts, a rotating pole changing device, and a source of current supply connected to said pole changing device through resistance, and means for shunting part of the resistance by the relay operated from one pair of drum segments and for shunting additional resistance when the relay is operated from the other pair of drum contacts.

11. In a telegraph system, a movable coil receiving device having a movable contact arranged adjacent to a rotating drum insulated contacting segments on said drum on opposite sides of an insulating center segment, means for causing said contacting device to move to the different segments on either side of the center in response to impulses of different current values, an electrical connection from the respective segments on one side of the center to the corresponding segment on the other side of the center, and relays connected to the respective pairs of segments operated in response to contact with either one of a pair of segments and a recording device arranged to operate in response to the respective relays in long and short marking of substantially vertical form in response to the respective relays.

12. In a telegraph system in connection with a receiving device comprising a movable coil with a contacting arm, a rotating drum with multiple segments electrically connected in pairs on opposite sides of a central insulating segment, transmitting relays connected to the respective pairs of segments and adapted to be operated by varying movements of the movable coil in response to current impulses of different current values, a source of current supply, a pole changing device with means for producing alternating current of substantially sine wave form, means for varying the amplitude of individual cycles by the operation of the transmitting relays, and a stop and start mechanism for said pole changing device operated by the contact of the movable arm with either one of one pair of drum segments whereby the pole changing device is started by and with the incoming signals.

13. In an alternating current telegraph system in which individual half cycles are varied in response to dot and dash transmitting devices, a receiver of the movable coil type with a contacting device arranged adjacent to a revolving drum having segments on opposite sides of an insulating center, the segments on opposite sides being connected in pairs, transmitting relays connected to the respective pairs of segments and operated by the contact of said movable arm with either one of the respective pairs of the rotating segments, a rotating transmitting device operating in connection with said transmitting relays and a stop and start mechanism in connection with said rotating device, and means for operating the same by the contact of said movable arm with either one of one pair of the rotating segments so as to start the rotating transmitting device with the incoming signals.

14. In an alternating current cable system in which current impulses of different amplitude are supplied in phase with the half cycles of the alternating current, a receiving device embodying a revolving drum and a movable contact, said drum having segments arranged in pairs, one segment for each pair being on the opposite side of the center of said drum, the movable contact being adapted to move in response to current impulses of different current value, and a transmitting device operating in connection with said receiving mechanism to repeat the impulses received upon said rotating drum and means for starting said transmitting device when said movable contact engages either segment of one pair of said segments.

15. The method of amplifying telegraph signal impulses which consists in generating a current of the same polarity and potential by the movement of the impulse receiving device, and employing the generated current for changing the potential on the grid of a thermionic tube by the potential of the generated current and utilizing the changes in the potential of said tube for operating signal translating devices from the plate circuit of said tube.

16. In a telegraph receiver, two mechanically connected and non-inductively related coils suspended in proximity to magnets, one of said coils being connected to a telegraph conductor and the other of said coils being connected to a translating device, said coils being operated together by the current impulses from the conductor to the coil connected thereto, the movement of the other coil being adapted to generate currents of like character to those impressed on the first coil and means for magnifying the generated current in said second coil.

17. In a telegraph receiver, two suspended coils mechanically connected together in proximity to magnets, one of said coils being adapted to receive current impulses and to move the other coil therewith, said second coil being non-inductively related to the first coil and adapted by its movement in relation to said magnets to generate current impulses of corresponding characteristics to those received in the first coil and mechanism connected to said second coil for translating the impulses generated therein.

18. In a telegraph receiver, two independent suspended coils in proximity to magnets, said coils being mechanically connected and non-inductively related, one of said coils being adapted to move by current impulses supplied thereto and to move the other coil and cause similar impulses to be generated by the movement of said second coil in proximity to said magnets, means for amplifying the current generated in said second coil and a signal translating device operated by said amplified impulses.

19. In an alternating current telegraph system, means for impressing alternating current of approximately sine wave form on a telegraph conductor and augmenting certain cycles of said alternating current of either polarity to indicate signals, a receiving device having two suspended coils in proximity to magnets, one to receive the alternating current impulses of different current values and to operate the other coil to cause it to generate current impulses of similar characteristics by its movement in relation to said magnets, means for amplifying the current impulses generated in said second coil, a movable contact operated by said magnified currents and a revolving drum having multiple segments adapted to be engaged by said movable contact as the same is moved in response to the impulses of different current value and recording devices operated by these variable movements.

20. In a telegraph system in which alternating currents of approximately sine wave form is applied to the conductor and the amplitude of half cycles varied in phase with the frequency of the alternating current in response to telegraph signals, a receiving device operated by the current impulses to cause long or short movements of a contacting device, a revolving drum having multiple segments arranged in pairs to be engaged by said contacting device, one pair by short movements and the other by long movements, a transmitting device connected to said segments and means connected with one pair of segments to cause the transmitting device to start and move in synchronism with the received signals.

21. In an alternating current telegraph system, a repeating device comprising a normally inoperative transmitter with means for starting and rotating the same, a receiving device having multiple contacts closed in response to impulses of different current value, one of said contacts being adapted to close a circuit to start the transmitting device and cause it to rotate in synchronism with the received impulses and repeat the same.

In testimony whereof, I have hereunto set my hand this 23rd day of April, 1924.

WILLIAM M. BRUCE, Jr.